US009057362B2

(12) United States Patent
McIver

(10) Patent No.: US 9,057,362 B2
(45) Date of Patent: Jun. 16, 2015

(54) SUBLIMATION PUMP AND METHOD

(75) Inventor: Carl R. McIver, Everett, WA (US)

(73) Assignee: The Boeing Company, Chicago, IL (US)

(*) Notice: Subject to any disclaimer, the term of this patent is extended or adjusted under 35 U.S.C. 154(b) by 610 days.

(21) Appl. No.: 13/247,831

(22) Filed: Sep. 28, 2011

(65) Prior Publication Data

US 2013/0078112 A1     Mar. 28, 2013

(51) Int. Cl.
| F04B 37/06 | (2006.01) |
| F03G 7/08 | (2006.01) |
| B01J 37/02 | (2006.01) |

(52) U.S. Cl.
CPC .............. *F03G 7/08* (2013.01); *B01J 37/0238* (2013.01); *F04B 37/06* (2013.01)

(58) Field of Classification Search
CPC ......... F04B 37/02; F04B 37/04; H02K 7/025; B01J 37/0238
USPC .......................... 417/48, 51; 74/572.1, 571.11
See application file for complete search history.

(56) References Cited

U.S. PATENT DOCUMENTS

| 3,811,794 | A | * | 5/1974 | Dunkleberger et al. | ........ 417/49 |
| 3,824,039 | A | * | 7/1974 | Power | ............................ 417/48 |
| 4,137,012 | A |   | 1/1979 | Della Porta et al. | |
| 5,462,402 | A |   | 10/1995 | Bakholdin et al. | |
| 5,614,777 | A |   | 3/1997 | Bitterly et al. | |
| 6,182,531 | B1 |   | 2/2001 | Gallagher et al. | |
| 6,585,490 | B1 | * | 7/2003 | Gabrys et al. | ................... 417/51 |
| 7,053,589 | B2 |   | 5/2006 | Gabrys et al. | |
| 2009/0017070 | A1 |   | 1/2009 | Liang et al. | |
| 2009/0033145 | A1 |   | 2/2009 | McIver et al. | |

OTHER PUBLICATIONS

Grobner, "Vacuum for Accelerators", Sep. 22, 2004.
Vacotec, "Ion Getter Pumps and Titanium Sublimation Pumps," Jul. 2007, p. 11-11.
Adixden, "Molecular Drag Pumps," May 2006.
Boeing, "Grid Scale Energy Storage Technology Opportunities", Nov. 11, 2010.
Boeing, "Design, Fabrication, and Test of a 5-kWh/100-kW Flywheel Energy Storage Utilizing a High-Temperature Superconducting Bearing", Nov. 6, 2007.
Wikipedia, "Titanium sublimation pump," available at <http://en.wikipedia.org/wiki/Titanium_sublimation_pump>, last visited Aug. 12, 2011.
Wikipedia, "Flywheel energy storage", available at <http://en.wikipedia.org/wiki/Flywheel_energy_storage>, last visited Aug. 12, 2011.
Strasik, "An overview of Boeing flywheel energy storage systems with high-temperature superconducting bearings", Supercond. Sci. Technol., Feb. 22, 2010.

(Continued)

*Primary Examiner* — Devon Kramer
*Assistant Examiner* — Patrick Hamo

(57) ABSTRACT

A vacuum pump may comprise a grating, and a sublimation element. The grating may have a grating opening and a grating interior that may be bounded by at least one grating surface. The sublimation element may be located within the grating interior and may be configured to sublimate and form a reactive film on the grating interior upon heating of the sublimation element above the sublimation temperature. The reactive film may be effective to capture gas molecules entering the grating interior through the grating opening and contacting the reactive film.

19 Claims, 10 Drawing Sheets

(56) References Cited

OTHER PUBLICATIONS

Boeing, "Boeing Working to Develop Flywheel Technology for Utility Companies", Feb. 17, 1998.
Beacon Power, "Fact Sheet: Frequency Regulation and Flywheels", Jun. 2009.
Beacon Power, "Frequency Regulation", available at <http://beaconpower.com/solutions/frequency-regulation.asp>, last visited Aug. 12, 2011.
Beacon Power, "About Flywheel Energy Storage", available at <http://beaconpower.com/products/about-flywheels.asp>, last visited Aug. 12, 2011.
Wilmington Advocate, "Explosion, fire had department scrambling", available at <http://www.wickedlocal.com/wilmington/local_news/x1172489247>, last visited Aug. 12, 2011.
Kurt J. Lesker Company, "Pump_Classifications", available at <http://www.lesker.com/newweb/Vacuum_Pumps/vacuumpumps_technicalnotes_1.cfm>, last visited Sep. 22, 2011.

* cited by examiner

SUBLIMATION PUMP AND METHOD

FIELD

The present disclosure relates generally to vacuum pumps and, more particularly, to a semi-passive sublimation pump for maintaining an ultra-high vacuum in a vacuum chamber.

BACKGROUND

Flywheels provide an economical and environmentally-friendly means for storing energy. Flywheels store energy by converting electrical energy into kinetic energy of the rotating mass of a flywheel rotor turning at a relatively high velocity (i.e., 20,000 to 30,000 rpm). A motor/generator may be coupled to the flywheel to accelerate the flywheel rotor to the relatively high velocity. The motor/generator may be coupled to an electrical power system. For example, the motor/generator may be coupled to a utility power grid. During periods of low demand for electricity, the electric motor/generator may draw electricity from the utility power grid to accelerate the flywheel rotor and convert the electricity into kinetic energy of the rotating flywheel rotor mass. Once the flywheel rotor reaches the desired velocity, electricity may be provided to the motor/generator on an intermittent or as-needed basis to maintain the flywheel rotor at the desired velocity. During periods of high demand for electricity, the flywheel rotor mass may be used to rotate the motor/generator to convert the kinetic energy of the flywheel rotor back into electricity which may be distributed to the utility power grid.

The efficiency of a flywheel energy storage system can be significantly improved by housing the flywheel in a vacuum chamber. The vacuum chamber may improve the efficiency of the flywheel energy storage system by minimizing thermal losses in bearings that support the flywheel. The bearings may include passive magnetic bearings provided in combination with permanent magnets and a high temperature superconductor magnet system. The permanent magnets provide a lifting force for suspending the flywheel in position. The superconductor magnet system may stabilize the position of the flywheel. In order to maintain the superconductor magnet system at the relatively low temperatures required (e.g. 77° Kelvin or colder), a liquid nitrogen cooling system may be included with the flywheel energy storage system to circulate liquid nitrogen through superconductors. Unfortunately, liquid nitrogen cooling systems impose a significant weight penalty and require regular maintenance and servicing in order to maintain the liquid nitrogen at the necessary levels.

In an attempt to avoid the weight and maintenance penalties associated with liquid nitrogen cooling systems, self-contained cryocoolers may be implemented in the flywheel energy storage system to cool the superconductors. Unfortunately, at the relatively low temperatures required for operating the superconductor magnet system, air molecules in the vacuum chamber may transfer a significant amount of heat between the superconductors. The heat transferred by the air molecules may exceed the ability of the cryocoolers to maintain the superconductor at the low operating temperatures. In addition, cryocoolers may consume relatively large amounts of power which may reduce the overall efficiency of the flywheel energy storage system.

The vacuum chamber may also improve the efficiency of the flywheel energy storage system by minimizing aerodynamic drag or frictional losses that may occur when gas molecules (e.g., air molecules) in the vacuum chamber come into contact with the flywheel rotor outer surface moving at a relatively high velocity. Over a relatively short period of time, the friction between the air molecules and the flywheel rotor outer surface may result in significant heating of the flywheel to an extent that the structural integrity of the flywheel may be compromised. Attempts to minimize the quantity of air molecules within the vacuum chamber and reduce the vacuum pressure include mounting several different types of vacuum pumps to the vacuum chamber. For example, a transfer pump may be mounted to the vacuum chamber to urge gas molecules toward an outlet of the transfer pump whereupon the gas molecules may be discharged to the outside environment. Unfortunately, such transfer pumps may result in localized areas within the vacuum chamber that have a relatively high vacuum such as near the pump outlet while remaining areas within the vacuum chamber have a reduced vacuum level (i.e. relatively higher pressure) such as at the flywheel rotor outer surface.

As can be seen, there exists a need in the art for a system for providing an ultra-high vacuum in a vacuum chamber which has minimal power requirements. In addition, there exists a need in the art for a system and method for providing an ultra-high vacuum in a vacuum chamber which has a relatively low system weight in order to improve the power density of the flywheel energy storage system such that overall system efficiency is increased. Additionally, there exists a need in the art for a system and method for providing an ultra-high vacuum in a vacuum chamber which provides for a uniform vacuum throughout the vacuum chamber such that aerodynamic drag is minimized at the flywheel rotor outer surface.

BRIEF SUMMARY

The above-noted needs associated with ultra high levels in vacuum chambers are specifically addressed and alleviated by the present disclosure which, in an embodiment, provides a vacuum pump which may comprise at least one grating and at least one sublimation element. The grating may have a grating opening and a grating interior bounded by at least one grating surface. The sublimation element may be located within the grating interior and may be configured to sublimate and form a reactive film on the grating interior upon heating of the sublimation element above a sublimation temperature.

In the present disclosure, the reactive film may comprise a condensed film or a deposited film of material that may coat the grating surfaces when the sublimation element is heated above the sublimation temperature. For example, the sublimation of a titanium filament due to heating may result in the deposition of a reactive titanium film on the grating surfaces. The reactive film may be effective to capture gas molecules entering the grating interior through the grating opening and reacting with the reactive film and/or embedding within the reactive film. The reactive film may react with or chemically bind to gas molecules that contact the reactive film. The reactive film may have a sponge-like structure that may chemically react with the gas molecules. The sponge-like structure of the reactive film may facilitate the embedding of gas molecules within the reactive film on or near the surface of the reactive film.

In a further embodiment, disclosed is a vacuum pump for a vacuum chamber containing a moving element. The vacuum pump may comprise a grating and a sublimation filament. The grating may be mounted within the vacuum chamber and may have a grating opening and a grating interior bounded by at least one grating surface. The sublimation filament may be mounted within the grating interior and may be configured to sublimate into a sublimated gas upon heating of the sublimation filament above a sublimation temperature. The sublimated gas may be deposited onto the grating surface as a relatively thin reactive film. The reactive film may be configured to capture gas molecules entering the grating interior through the grating opening and contacting the reactive film. The grating may be configured such that the gas molecules contacting the moving element are directed toward the grating opening and into the grating interior.

Also disclosed is the method of reducing pressure in a vacuum chamber. The method may comprise the step of heating a sublimation element located within a grating having a grating opening and a grating interior defined by at least one grating surface. The method may further include heating the sublimation element, forming a reactive film on the grating surface, and directing a gas molecule through the grating opening and into the grating interior. The method may further include attaching the gas molecule to the reactive film.

In a further embodiment, disclosed is a method of reducing pressure in a vacuum chamber. The method may comprise heating a sublimation element mounted within a grating having a grating opening and a grating interior at least partially defined by a plurality of grating surfaces. The method may further include the step of applying an electrical current to the sublimation element to heat the sublimation element through ohmic heating. The method may also include heating the sublimation element above a sublimation temperature to cause sublimation of the sublimation element and producing a sublimated gas. The sublimated gas may be deposited onto the grating surface to form a reactive film. The method may include contacting gas molecules with a moving element. The moving element may be located adjacent to the grating opening. The method may further include directing the gas molecules toward the grating opening and into the grating interior as a result of the gas molecules contacting the moving element. Additionally the method may include the steps of contacting the gas molecules with the reactive film and binding the gas molecules to the reactive film.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein.

DETAILED DESCRIPTION

Figure 1:
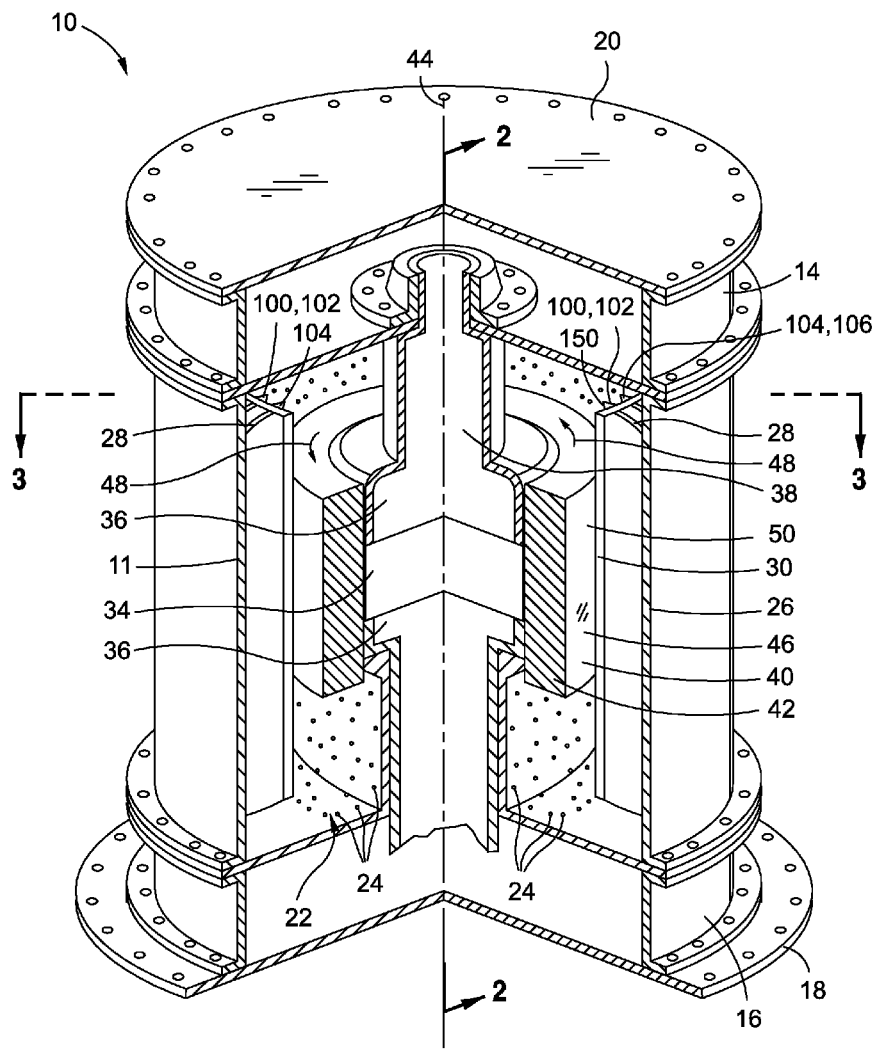
FIG. 1 is a perspective illustration of an embodiment of a flywheel energy storage system including a flywheel rotatably supported within a vacuum chamber, the vacuum chamber having an embodiment of a sublimation pump mounted within the vacuum chamber.

Referring now to the drawings wherein the showings are for purposes of illustrating preferred and various embodiments of the disclosure, shown in FIG. 1 is a partially cutaway perspective illustration of a flywheel energy storage system 10 that may incorporate a vacuum pump 100 as disclosed herein. It should be noted that the vacuum pump 100 disclosed herein may be implemented in any one of a variety of applications and is not limited to implementation in a flywheel energy storage system 10. For example, the vacuum pump 100 may be implemented in any one of a variety of aerospace and military applications where relatively high vacuum levels are required. The vacuum pump 100 may also be implemented in any one of a variety of scientific and industrial applications as described below. For purposes of illustrating various embodiments of the vacuum pump 100 as disclosed herein, the vacuum pump 100 is described in the context of a flywheel energy storage system 10.

In FIG. 1, the flywheel energy storage system 10 may include a flywheel rotor 42 that may be mounted to a hub 34. The hub 34 may be rotatably supported by upper and lower bearings 36. The flywheel energy storage system 10 may further include a motor/generator 38 coupled to the hub 34. The motor/generator 38 may accelerate the flywheel rotor 42 up to desired rotational speed in order to store energy in the rotating mass of the flywheel rotor 42. Alternatively, the rotating mass of the flywheel rotor 42 may be used to drive the motor/generator 38 such that the kinetic energy of the flywheel rotor 42 may be converted into electricity. The flywheel rotor 42, the hub 34, the motor/generator 38, and the bearings 36 may be housed within a vacuum chamber 22. The vacuum chamber 22 may be comprised of an outer wall 11 mounted to upper and lower rings 14, 16 and enclosed by a base 18 and a cap 20.

Figure 2:
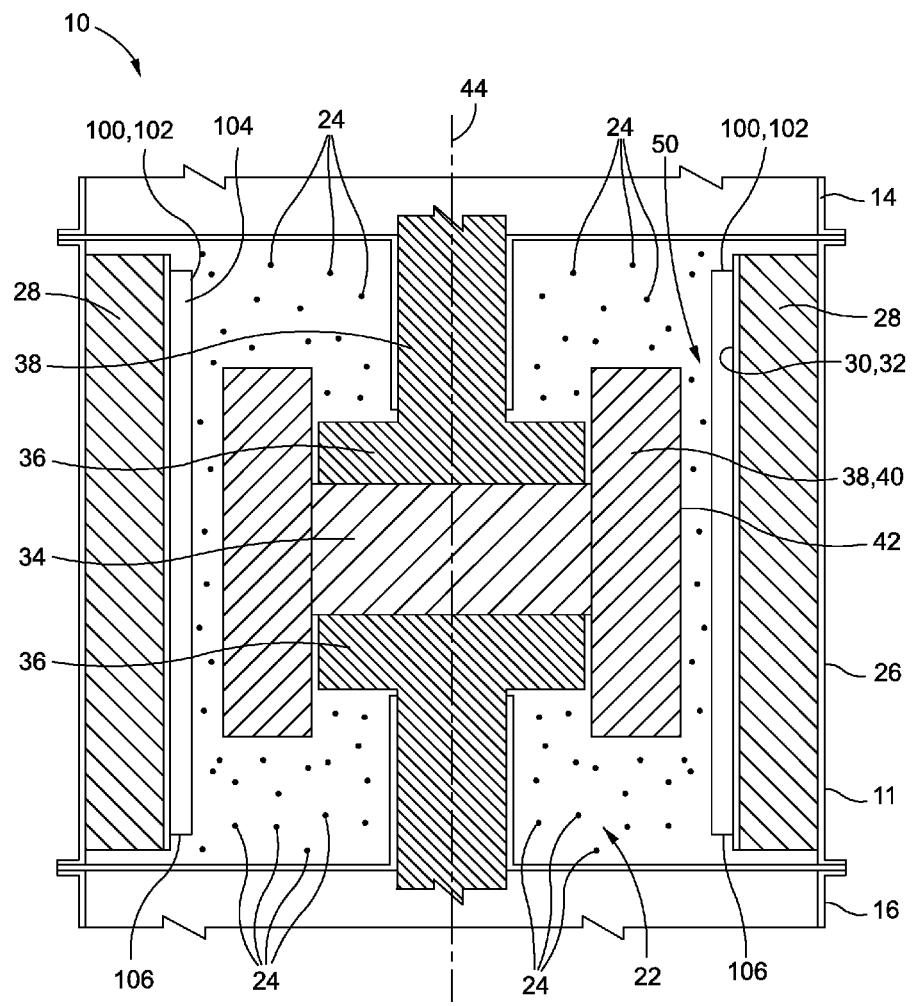
FIG. 2 is a cross-sectional illustration of the flywheel energy storage system taken along line 2 of FIG. 1 and illustrating the flywheel supported within the vacuum chamber.

Referring to FIGS. 1 and 2, the flywheel energy storage system 10 may include a plurality of energy absorbing elements 28 circumferentially arranged between an inner wall 30 and the outer wall 11 of the flywheel rotor 42. The inner wall 30, the energy absorbing elements 28, the outer wall 11, the upper and lower rings 14, 16, and the base 18 and cap 20 may comprise a containment vessel 26 for containing the flywheel rotor 42 in the event of a loss of structural integrity of the flywheel rotor 42.

FIG. 2 illustrates a plurality of trace gas molecules 24 within the vacuum chamber 22. The gas molecules 24 may be generated by outgassing of the various materials that make up the components of the flywheel energy storage system 10. In addition, the gas molecules 24 may comprise trace molecules of air, water vapor, and various other molecules. A portion of the gas molecules 24 may be initially evacuated from the vacuum chamber 22 by one or more roughing pumps (not shown) to reduce the pressure of the vacuum chamber 22 down to an initial vacuum level.

Figure 3:
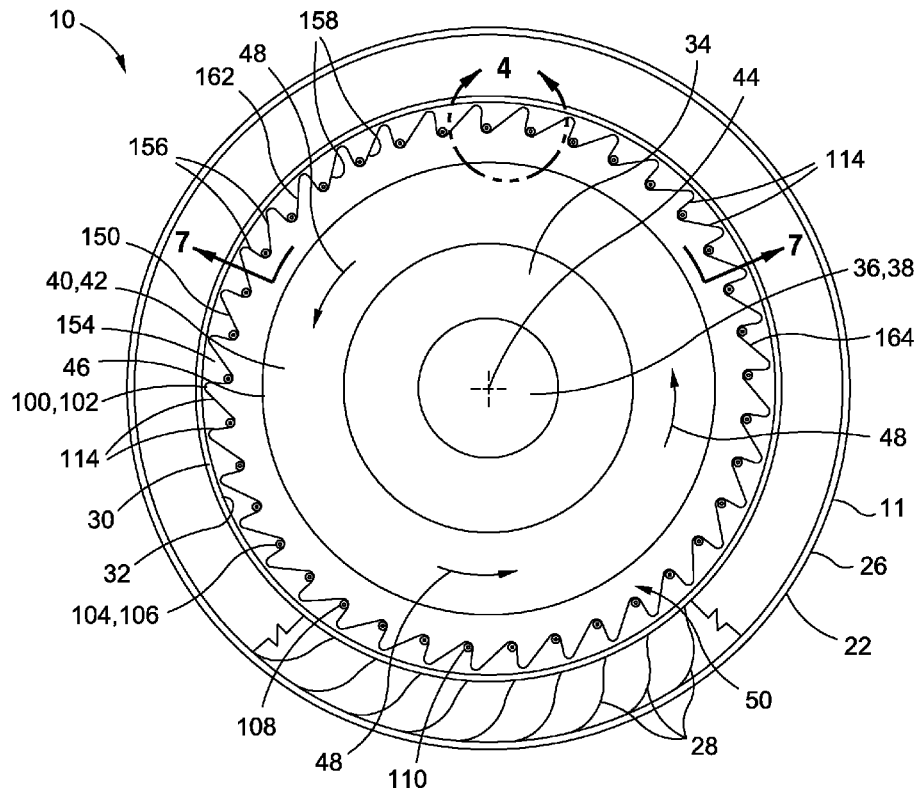
FIG. 3 is a top sectional illustration of the flywheel energy storage system taken along line 3 of FIG. 1 and illustrating an embodiment of the sublimation pump mounted within an annular gap between the flywheel and an inner wall of the flywheel energy storage system.

FIGS. 2-3 further illustrate the vacuum pump 100 configured as a sublimation pump 102 installed within the vacuum chamber 22 to reduce the pressure within the vacuum chamber 22. The sublimation pump 102 may be included with the vacuum chamber 22 to maintain or improve the vacuum level provided by one or more roughing pumps (not shown). For example, the sublimation pump 102 may be configured to reduce the pressure within the vacuum chamber 22 to an ultra-high vacuum level as described below once a roughing pump reduces the vacuum to a high vacuum level.

The sublimation pump 102 as disclosed herein may be configured as a molecular gas getter vacuum pump and may also be described as an evaporable getter pump. Advantageously, evaporable getter pumps have a relatively simple operation with no moving parts, consume small amounts of power, and can reliably maintain a desired vacuum level within a vacuum chamber 22 for extended periods of time with relatively little maintenance. Evaporable getter pumps rely on chemical reactions to reduce and/or maintain a relatively high or ultra-high vacuum level within a vacuum chamber 22. Because the vacuum pumping provided by evaporable getter pumps is a chemical process, relatively small amounts of electrical power are required to maintain the desired vacuum level. For example, electrical power is generally required for a relatively short period of time for initially heating a sublimation material 110 (FIG. 4) to cause the initial evaporation or sublimation of sublimation material 110 and the formation of a reactive film 114 (FIG. 9) on surfaces adjacent to the sublimation material 110. As described in greater detail below, gas molecules 24 floating in the vacuum chamber 22 come into contact with the reactive film 114 and react with the reactive film 114. The reactive film 114 then chemically binds with the gas molecules 24 and traps the gas molecules 24 which results in a reduction of pressure within the vacuum chamber 22.

Over time, as the reactive film 114 becomes saturated with gas molecules 24, electrical power may again be applied to the sublimation material 110 on an as-needed basis to heat the sublimation material 110 as described below and form a new layer of reactive film 114 such that the chemical pumping may continue within the vacuum chamber 22. The process of applying power to heat the sublimation material 110 and form a new layer of reactive film 114 may be repeated numerous times over a relatively long operating life (e.g., years) of the vacuum pump 100 without replacing the sublimation material 110 and without servicing the evaporable getter pump. In addition, evaporable getter pumps may achieve an ultra-high vacuum level within a relatively short period of time once the initial vacuum is provided by one or more roughing pumps (not shown). Furthermore, evaporable getter pumps such as the sublimation pump 102 described herein are significantly lighter in weight than a majority of other ultra-high vacuum pump configurations due to the simple operation (i.e., no moving parts) and relatively low part count of evaporable getter pumps. The relatively low weight of evaporable getter pumps is advantageous for applications where weight is an important factor such as in aerospace and military applications and in energy storage applications such as in flywheel energy storage systems 10 where a low overall system weight may facilitate air transport (e.g., helicopter transport) of flywheel energy storage systems 10 such as to remote locations.

The low power and low maintenance requirements, high reliability, and long operating life of the sublimation pump 102 disclosed herein may advantageously be applied to any one of a variety of applications. For example, the sublimation pump 102 may advantageously be applied to mass spectrometry in sampling planetary atmospheres, for diagnostic testing in space environments, for monitoring air quality of manned space flights, and for other space-based applications where ultra-high vacuum levels are required. The sublimation pump 102 disclosed herein may also advantageously be implemented in the semi-conductor industry where ultra-high vacuum levels are required. For example, in wafer processing, it may be necessary to repeatedly bring a wafer processing chamber to a relatively high vacuum level in order to substantially void the chamber of contaminants. From a commercial standpoint, the sublimation pump 102 may advantageously be incorporated in such a wafer processing operation due to the capability of the sublimation pump 102 to rapidly attain an ultra-high vacuum level.

Referring to FIGS. 2-3, in an embodiment, the sublimation pump 102 may include one or more gratings 150 of any geometry and which may be mounted within the vacuum chamber 22. For example, in FIGS. 2-3, the sublimation pump 102 comprises a plurality of axially-oriented gratings 150 having generally straight, elongated sublimation filaments 106 mounted within the grating interiors 154 and extending lengthwise along the grating interiors 154. However, the gratings 150 may be provided in any geometry, without limitation, that facilitates the capturing of gas molecules 24. In this regard, the grating 150 geometry is not limited to the geometry illustrated in the figures and described in the context of an flywheel energy storage system 10 but may be provided in any size, shape, and configuration wherein gas molecules 24 entering the grating interior may be captured by the reactive film 114 on the grating interior surfaces 156. As was indicated above, electrical current 124 (FIG. 7) may be applied to one or more of the sublimation filaments 106 to cause heating of the sublimation filaments 106. The heating of the sublimation filaments 106 may result in sublimation of the sublimation filaments 106.

The sublimation of the sublimation filaments 106 may result in the production of a sublimated gas 112 (FIG. 9) which may be deposited onto the grating 150 surfaces as a reactive film 114 (FIG. 10) formed on the grating interior surfaces 156. However, the reactive film 114 may also be formed on one or more of the grating exterior surfaces 158 and/or on other surfaces within the vacuum chamber 22 such as on the inner wall 30. The gas molecules 24 (FIG. 2) within the vacuum chamber 22 may contact and react with the reactive film 114 and may form stable bonds with the reactive film 114. In this manner, the reactive film 114 may bind, trap, absorb, capture, or otherwise embed or retain the gas molecules 24. The capturing of the gas molecules 24 by the reactive film 114 may improve the vacuum level initially provided by one or more roughing pumps (not shown). For example, the sublimation pump 102 may reduce the vacuum in the vacuum chamber 22 to a pressure of at least approximately $1 \times 10^{-4}$ Torr and, preferably, may reduce the vacuum to a pressure of at least $1 \times 10^{-5}$ Torr or less. In embodiments, the sublimation pump 102 may reduce the vacuum in the vacuum chamber 22 to a pressure of at least approximately $1 \times 10^{-7}$ Torr or less.

Advantageously, the sublimation pump 102 as disclosed herein may exploit the parasitic drag action that may be provided by a moving element 40 (FIG. 9) that may be mounted within the vacuum chamber 22. For example, in an embodiment of the sublimation pump 102 shown in FIG. 11, the sublimation pump 102 may exploit the parasitic drag action provided by a moving outer surface 46 of the flywheel rotor 42 which may be located adjacent to the gratings 150 (FIG. 3). Contact of the gas molecules 24 (FIG. 9) with the moving outer surface 46 may result in the gas molecules 24 being directed toward one or more grating openings 152 that may be formed in one or more of the gratings 150. In embodiments, each grating 150 may have a grating interior 154 (FIG. 3) having an interior geometry that may be configured to retain the gas molecules 24 within the grating interior 154. In this regard, the internal geometry of the grating interior 154 may be configured such that the gas molecules 24 have a reduced probability of exiting the grating interior 154 once the gas molecules 24 enter the grating interior 154.

Figure 12:
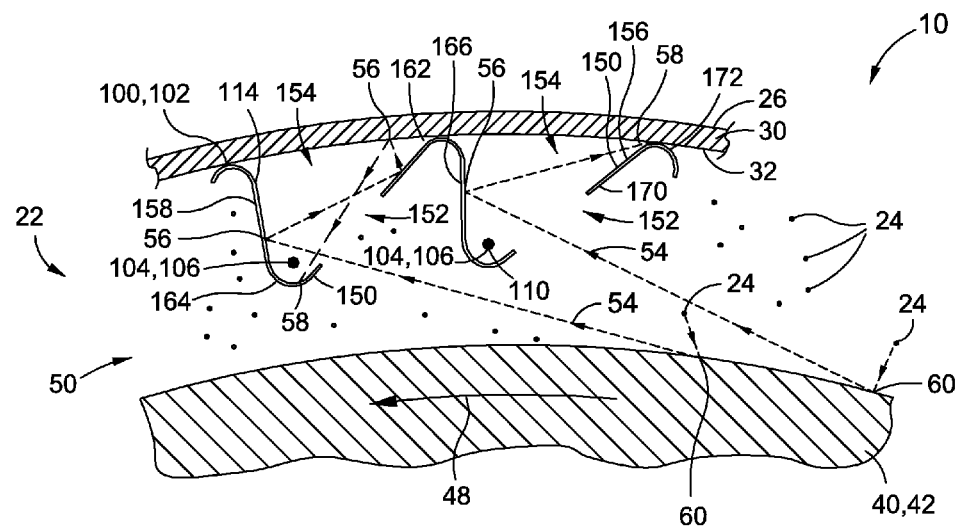
FIG. 12 is a cross-sectional illustration of the sublimation pump taken along line 12 of FIG. 11 and illustrating the gas molecules deflecting off of the grating interior surfaces until the kinetic energy of the gas molecules falls to a level below that of the binding capability of the reactive film.

For example, referring briefly to FIG. 12, the grating interior 154 geometry may be configured to cause a gas molecule 24 entering the grating interior 154 to be deflected toward other grating 150 surfaces within the grating interior 154 if the gas molecule 24 is not initially bound 58 to the first reactive film 114 that the gas molecule 24 contacts upon entering the grating interior 154. The internal geometry of the grating interior 154 may be configured such that the kinetic energy of the gas molecule 24 may be reduced each time the gas molecule 24 deflects 56 off one of the grating 150 surfaces. The kinetic energy may be reduced to a level that is less than the capturing or binding capability of the reactive film 114 after which the gas molecules 24 may be captured by or bound to the reactive film 114 as described in greater detail below.

Figure 14:
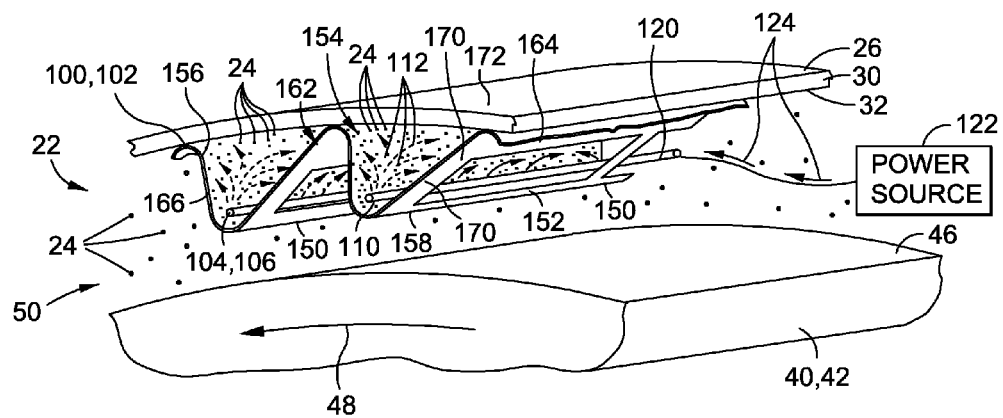
FIG. 14 is a perspective illustration of the sublimation pump illustrating the reheating of the sublimation elements in response to application of electrical current and resulting in the generation of sublimated gas.
Figure 15:
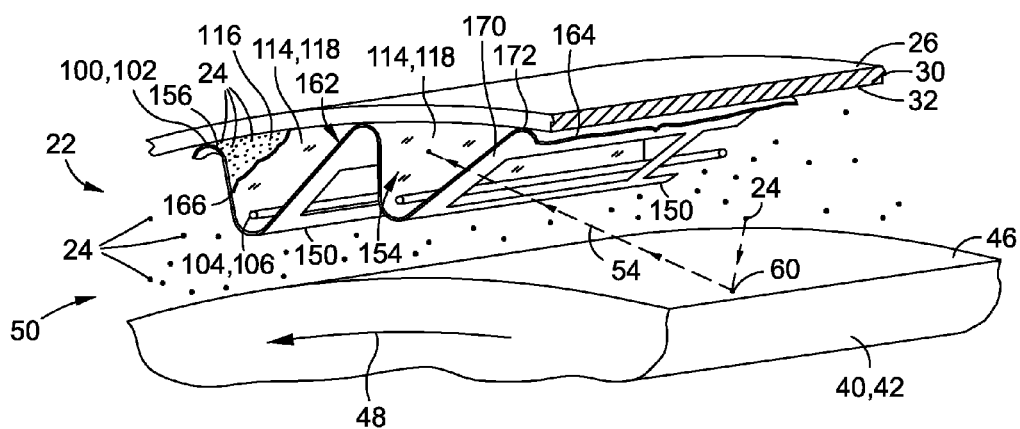
FIG. 15 is a perspective illustration of the sublimation pump showing a new layer of reactive film applied over the previously applied layer of reactive film and resulting in the sealing of the gas molecules between the layers of reactive film.

Advantageously, the sublimation pump 102 as disclosed herein may operate without receiving continuous electrical power. In this regard, the sublimation pump 102 acts as a chemical pump as indicated above wherein gas molecules 24 may be chemically bound or captured by the reactive film 114 at a rate that is dependant upon the gas load of the gas molecules 24. As mentioned above and as described in greater detail below, when the reactive film 114 is exhausted or saturated due to the capturing of a plurality of gas molecules 24, electrical current 124 (FIG. 14) may be re-applied to the sublimation elements 104 in order to flash or re-heat the sublimation elements 104 and form a subsequent or new layer 118 (FIG. 15) of reactive film 114 (FIG. 15) over the previously applied 116 (FIG. 14) layer of reactive film 114 (FIG. 14). The new layer 118 of reactive film 114 may cover the previously applied 116 layer of reactive film 114 and may thereby seal the gas molecules 24 between the two layers of reactive film 114 as shown in FIG. 15. The process may be repeated as needed in order to maintain a desired vacuum level within the vacuum chamber 22 as described below.

Referring to FIG. 3, shown is a top view of the flywheel energy storage system 10 illustrating the rotating flywheel rotor 42 and the plurality of gratings 150 that may be mounted to the inner wall 30 of the vacuum chamber 22 in the annular gap 50 between the flywheel rotor 42 outer surface 46 and the inner wall 30. The gratings 150 are shown arranged in a corrugated configuration 164 although the gratings 150 may be arranged in any size, shape, and configuration, without limitation. In the present disclosure, a corrugated configuration 164 of the gratings 150 may be defined as a grating geometry of any size, shape, or configuration that may generally repeat along at least one direction of the gratings 150. In this regard, the corrugated configuration 164 of the gratings 150 is not necessarily limited to a sinusoidal shape defined by the grating radial walls 166 and grating angled walls 170 and repeating along a circumferential direction as illustrated in the figures.

Figure 7:
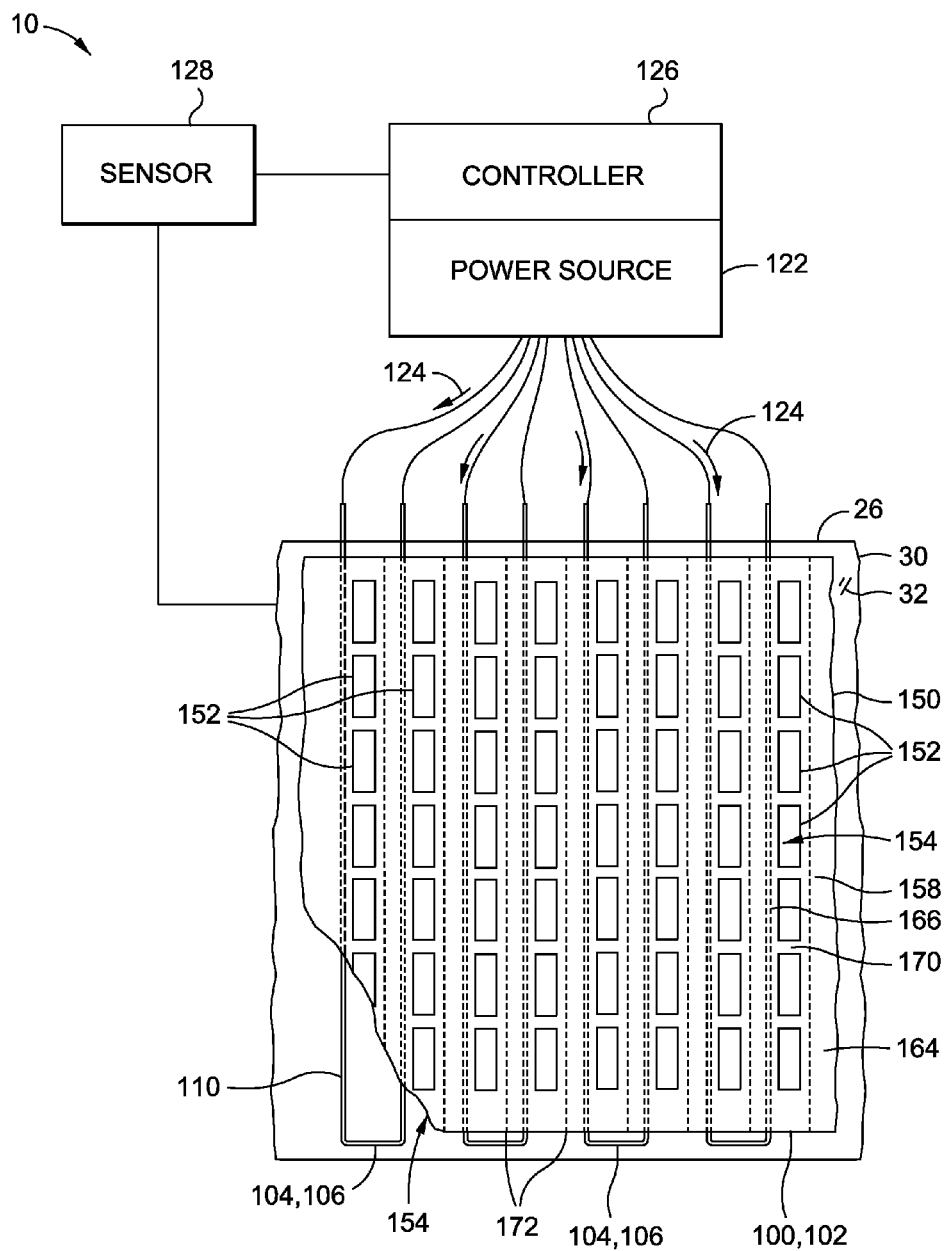
FIG. 7 is a flattened layout illustration of the sublimation pump taken along line 7 of FIG. 3 and illustrating a plurality of the sublimation elements electrically connected to a power source for providing electrical current to the sublimation elements.

Each one of the gratings 150 may include one or more sublimation elements 104. In embodiments, one or more of the sublimation elements 104 may be configured as an elongated filament 106 that may extend axially along a length of the gratings 150. One or more of the sublimation elements 104 may be configured to be heated. For example, one or more of the sublimation elements 104 may be connected to a power source 122 as illustrated in FIG. 7. The power source 122 may provide electrical current 124 (FIG. 7) to the sublimation elements 104 for heating the sublimation elements 104 and causing the sublimation thereof as described below.

Figure 4:
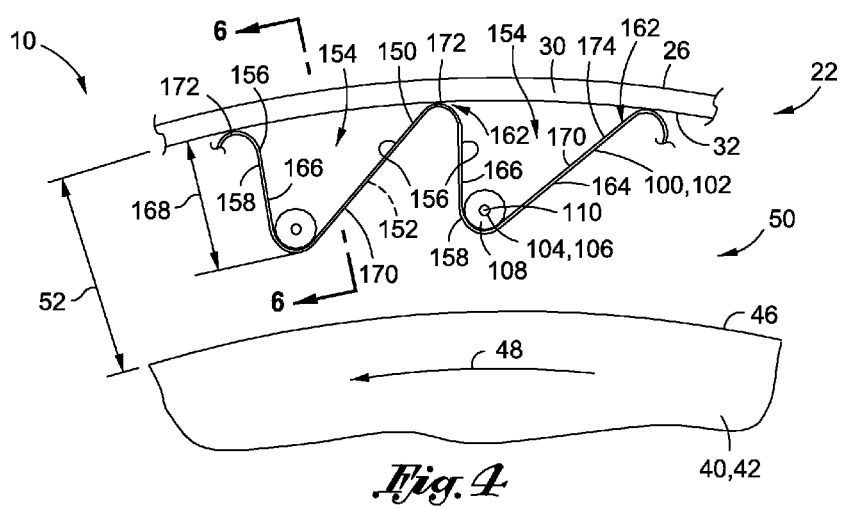
FIG. 4 is an enlarged view of a portion of the sublimation pump taken along line 4 of FIG. 3 and illustrating a plurality of sublimation elements extending along a length of a corresponding plurality of gratings.

Referring to FIG. 4, shown is an enlarged view of the gratings 150 mounted to the inner wall 30 of the flywheel energy storage system 10. In the embodiment shown, one or more of the gratings 150 may comprise a grating radial wall 166 and a grating angled wall 170 joined to one another at least partially along a length of the grating 150. The grating radial wall 166 may extend outwardly in a generally radial direction from the inner wall 30 at a radial height 168 from the inner wall 30. The radial heights 168 of adjacent gratings 150 may be generally equivalent or the radial heights 168 may vary between the gratings 150. The grating radial height 168 may be sized such that when the grating 150 in installed within the width 52 of the annular gap 50, the grating radial wall 166 has a predetermined amount of clearance with the outer surface 46 of the flywheel rotor 42. For example, the clearance may be such that gas molecules 24 may move with the annular gap 50 such that when the gas molecules 24 contact the outer surface 46 of the flywheel rotor 42, the gas molecules 24 may be directed into one of the grating openings 152. The grating angled wall 170 may include one or more of the grating openings 152. However, the grating openings 152 may be formed in the grating radial walls 166.

The gratings 150 may be affixed to the vacuum chamber 22 at one or more grating mounting portions 172. For example, the gratings 150 may be mounted to the inner wall 30 by mechanical fasteners (not shown) that may be extended through the grating mounting portions 172 and into the inner wall 30. However, the gratings 150 may be mounted within the vacuum chamber 22 by any suitable means. The gratings 150 are shown as having the same cross-sectional configuration and are generally concentrically mounted to the inner wall 30 of the containment vessel 26. However, the gratings 150 may be provided in any configuration and are not limited to the corrugated configuration 164 having substantially similar grating 150 cross sections as illustrated in FIGS. 3 and 4. Furthermore, the grating 150 is not limited to a generally triangular shape cross-section but may be provided in any one of a variety of sizes, and shapes and configurations, without limitation.

Referring still to FIG. 4, each one of the gratings 150 includes a grating interior 154 which may be bounded by the grating interior surfaces 156. In the embodiment shown, the inner wall surface 32 may also form a portion of the boundary of the grating interior 154 although the grating 150 may include a base portion (not shown) that may connect the grating radial wall 166 and grating angled wall 170. The sublimation elements 104 are shown configured as filaments 106 mounted within the apex of the radial wall 166 and the angled wall 170. However, the sublimation elements 104 or filaments 106 may be located at any position within the grating interior 154.

One or more of the sublimation elements 104 or filaments 106 may be mounted on or supported by electrical insulators 108. The electrical insulators 108 may electrically insulate and/or thermally insulate the sublimation elements 104 from the grating 150. The electrical insulators 108 may be formed of ceramic material although the electrical insulators 108 may be formed of any suitable material having relatively low electrical conductivity and/or relatively low thermal conductivity. It is further contemplated that one or more of the grating interiors 154 may include more than one sublimation element 104. For example, although not shown, each one of the grating interiors 154 may include a sublimation element 104 located at each one of the grating corners 162.

Figure 5:
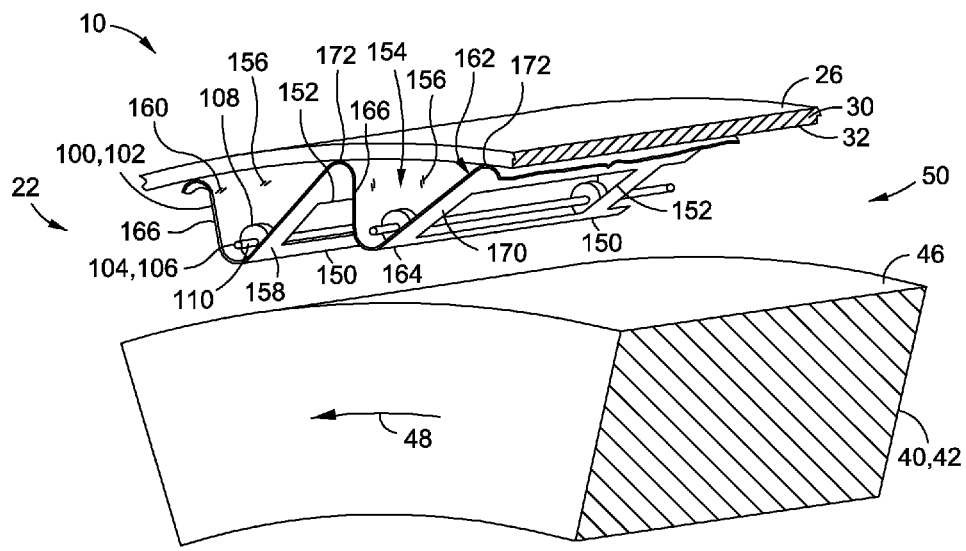
FIG. 5 is a perspective illustration of an embodiment of the sublimation pump of FIG. 4 and illustrating grating openings formed in the gratings.

Referring to FIG. 5, shown is a perspective view of a portion of a pair of the gratings 150 mounted to the inner wall 30. Each one of the gratings 150 may include one or more of the grating openings 152 to allow for the entrance of gas molecules 24 (FIGS. 2-3) into the grating interior 154. The electrical insulators 108 are shown located on one or both sides of the grating openings 152 to maintain a clear area for the gas molecules 24 to pass through the grating openings 152 and enter the grating interior 154. As can be seen in FIG. 5, the grating openings 152 may be oriented to face generally toward the direction of movement 48 of the outer surface 46 of the flywheel rotor 42 such that gas molecules 24 directed toward the grating openings 152 may pass through the grating openings 152 and enter the grating interiors 154 of the gratings 150.

In embodiments, the grating openings 152 are preferably oriented to face in a generally non-radial direction relative to the rotational axis 44 (FIG. 2) of the flywheel rotor 42 as illustrated in FIG. 5. In this regard, FIG. 5 illustrates the grating openings 152 formed on the grating angled walls 170 which are oriented in angled relation to the rotational axis 44 of the flywheel rotor 42. However, the grating openings 152 may be oriented in any direction and are not limited to the orientation shown in FIG. 5. Furthermore, the gratings 150 may be provided with a plurality of grating walls, one or more of which may be provided with grating openings 152. The grating openings 152 are preferably configured such that gas molecules 24 that contact 60 the moving flywheel rotor 42 and are directed toward the grating openings 152 may enter the grating interiors 154 whereupon the gas molecules 24 may contact the reactive film 114 (FIG. 3) and eventually bind with the reactive film 114.

Figure 6:
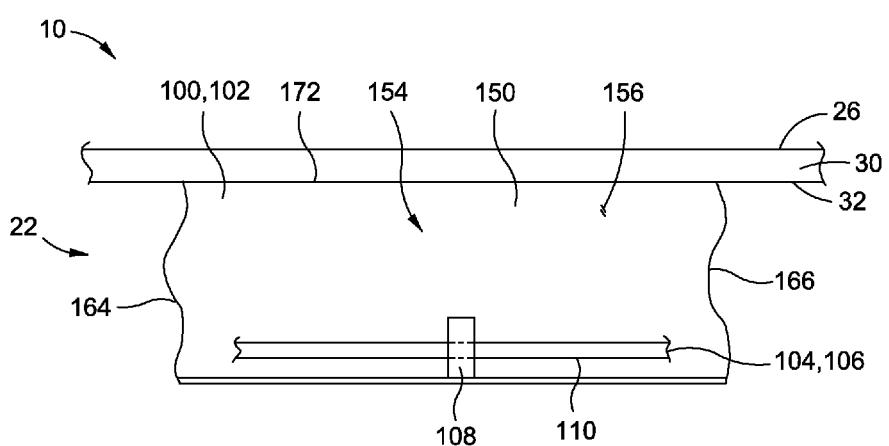
FIG. 6 is a sectional illustration of the sublimation pump taken along line 6 of FIG. 4 and illustrating a sublimation element supported by an electrical insulator mounted to the grating.

Referring to FIG. 6, shown is a sectional view of a portion of a grating 150 mounted to the inner wall 30. The sublimation element 104 is shown supported by the electrical insulator 108 which holds the sublimation element 104 in spaced relation to the grating interior surface 156. Although FIGS. 5 and 6 illustrate the sublimation element 104 as a generally elongated rod having a generally circular cross-section, the sublimation element 104 may be formed of any size, shape, and configuration. For example, the sublimation element 104 may be formed as a tube (not shown) of any cross section and of any size. Even further, the sublimation element 104 is not necessarily limited to being formed as an elongated element extending lengthwise within the vacuum chamber 22. For example, the sublimation element 104 may be formed in a circular arrangement (not shown) extending around the periphery or circumference of the inner wall 30 of the vacuum chamber 22 and may be housed within a complimentary-shaped grating.

Referring still to FIGS. 5 and 6, as was earlier mentioned, the sublimation elements 104 and the gratings 150 may be configured to take advantage of the parasitic drag of the gas molecules 24 (FIG. 11) that contact the moving element 40 (e.g., the flywheel rotor 42) and are directed into grating openings 152 to enhance or improve the molecule capturing capability of the sublimation pump 102. Further in this regard, the grating interiors 154 may be configured with an internal geometry or structure that may maximize the capability of the grating interior 154 to trap the gas molecules 24 within the grating interior 154 and prevent escape of the gas molecules 24. For example, it is contemplated that the grating openings 152 may include louvers (not shown) to provide additional grating 150 surfaces that the gas molecules 24 may deflect 56 off of to trap the gas molecules 24 within the grating interior 154 once the gas molecules 24 pass through the grating openings 152. Additional internal structural features (not shown) may be included in the grating interior 154 to enhance the ability of the grating interior 154 to trap the gas molecules 24 and prevent the exiting of the gas molecules 24 before the gas molecules 24 bind with the reactive film 114 (FIG. 3).

As was indicated above, the gratings 150 may be provided in any quantity, size, shape, and configuration, without limitation, and are preferably arranged to maximize the probability of gas molecules 24 passing through the grating openings 152 and entering the grating interiors 154 after the gas molecules 24 are deflected toward the grating openings 152 as a result of contacting a moving element 40. The grating interiors 154 may have an internal geometry such that the gas molecules 24 are retained within the grating interiors 154 once the gas molecules 24 enter the grating interiors 154 to maximize the probability that the gas molecules 24 eventually contact and bind with the reactive film 114.

Referring to FIGS. 5 and 6, the sublimation element 104 may be formed of any suitable sublimation material 110. In an embodiment, the sublimation material 110 may be selected based upon the type of gas molecules 24 (FIG. 11) that may be present within the vacuum chamber 22 during the operating life of the vacuum chamber 22. Non-limiting examples of sublimation material 110 from which the sublimation element 104 may be formed may include aluminum, barium, columbium, magnesium, molybdenum, nickel, tantalum, thorium, titanium, zirconium, or any combination or alloy thereof. The reactive film 114 (FIG. 3) produced by sublimating the sublimation material 110 may be effective for capturing or binding with any one of a variety of gas molecules 24 including, but not limited to, hydrogen, oxygen, water vapor, carbon monoxide, carbon dioxide, nitrogen, and any other type of gas molecules 24. The grating 150 is preferably fabricated from a material that is complimentary to the sublimation element 104. For example, for a filament 106 formed of titanium, the grating 150 may likewise be formed of titanium to accommodate deposition of the reactive film 114 on the titanium grating.

In an embodiment, at least a portion of one or more of the grating 150 surfaces may be pre-coated with a non-evaporable getter 174 material (FIG. 4) to facilitate the capturing of noble gas molecules 24 (FIG. 11) and/or other gases that may not be reactive with the reactive film 114 (FIG. 3). Non-evaporable getter 174 material may applied to one or more grating 150 surfaces and the vacuum chamber 22 may be rough pumped down to an initial vacuum level. The non-evaporable getter 174 material generally remains in a solid state on a surface as opposed to evaporable getter material (i.e., the reactive film 114—FIG. 2) which is evaporated or sublimated onto a surface by the heating of sublimation material 110 as described below. Non-evaporable getter 174 material may facilitate the capture of noble gasses such as helium, neon, argon, krypton, xenon, radon, and other inert or non-reactive gases such as methane that may not be captured by evaporable getter material (e.g., the reactive film 114). The non-evaporable getter 174 material may be activated by heating such as by radiative heating (not shown) from the sublimation elements 104 when electrical current 124 (FIG. 9) heats the sublimation elements 104. Non-evaporable getter 174 material may comprise zirconium and alloys of zirconium containing vanadium, iron, cobalt, aluminum, and other elements and compounds.

Advantageously, by including non-evaporable getter 174 material and evaporable getter material (e.g., the reactive film 114) in a vacuum chamber 22, improved vacuum pumping may be achieved. Furthermore, non-evaporable getter 174 material may facilitate an improvement in the overall operating efficiency for a system that may be housed within the vacuum chamber 22. For example, in the context of a flywheel energy storage system 10, by including non-evaporable getter 174 material on one or more grating 150 surfaces of the sublimation pump 102, the overall energy efficiency of the flywheel energy storage system 10 may be improved due to a reduction in aerodynamic drag of the flywheel rotor 42. It is further contemplated that cryopumping (not shown) may occur within the vacuum chamber 22 due to cryogenics that may be present within the vacuum chamber 22. Such cryopumping may trap gas molecules 24 not otherwise captured by the reactive film 114. For example, cryopumping may trap gas molecules by condensing such gas molecules on a cold surface (not shown).

Referring to FIG. 7, shown is a flat layout of the gratings 150 mounted to the inner wall 30. The gratings 150 and sublimation elements 104 are shown oriented along a direction that is substantially parallel to a height of the flywheel energy storage system 10. In this regard, the gratings 150 and sublimation elements 104 are oriented generally parallel to a rotational axis 44 (FIG. 2) of the flywheel rotor 42. The grating openings 152 may be arranged in series along the grating angled wall 170 of each one of the gratings 150. Advantageously, the gratings 150 extend generally from a lower end of the inner wall 30 to an upper end of the inner wall 30 such that capture capability of the reactive film 114 (FIG. 3) is generally uniformly distributed along the height of the vacuum chamber 22 (FIG. 1). In addition, the arrangement of the gratings 150 around the circumference of the vacuum chamber 22 results in a generally uniform distribution of molecular capture capability along a circumferential direction of the vacuum chamber 22.

In this regard, the sublimation pump 102 as disclosed herein advantageously may provide a substantially uniformly distributed vacuum within the confined space of the annular gap 50 between the flywheel rotor 42 (FIG. 2) outer surface 46 (FIG. 2) and the inner wall 30 of the vacuum chamber 22. Such arrangement reduces aerodynamic drag along the flywheel rotor 42 caused by friction with gas molecules 24 that surround the flywheel rotor 42. In this regard, it should be noted that the sublimation pump 102 as disclosed herein is not limited to installation within a flywheel energy storage system 10 but may be applied to any vacuum chamber 22 requiring an ultra high vacuum in confined spaces. The sublimation pump 102 as disclosed herein provides a substantially uniform vacuum pressure in large confined spaces or in large aspect-ratio spaces or spaces having a narrow gap of long length and/or large width.

Referring still to FIG. 7, the sublimation elements 104 may be electrically connected to a power source 122 for providing electrical current 124 to the sublimation elements 104 to cause heating thereof due to resistance heating, ohmic heating or Joule heating. However, it is contemplated that the sublimation elements 104 may be heated by other means. In FIG. 7, the power source 122 is preferably configured to provide an electrical current 124 to the sublimation elements 104 at an amperage that is sufficient to heat the sublimation elements 104 above the sublimation temperature or above the vapor point wherein the sublimation material 110 transitions directly from a solid to a gas. Advantageously, the sublimation occurs without melting of the sublimation material 110 which allows the sublimation element 104 to be re-heated or flashed at later times in order to regenerate or form a new layer 118 of reactive film 114 (FIG. 3) after a previously applied 116 layer of reactive film 114 become saturated with gas molecules 24 (FIG. 13) and/or loses its reactive capability. The time period for heating or flashing the sublimation elements 104 may last from several seconds to several hours or longer and may depend upon a variety of parameters including, but not limited to, the quality of the initial vacuum, the availability of surface area upon which reactive film 114 may be applied, the proximity of the surface area to the sublimation elements 104, and other parameters.

As shown in FIG. 7, the power source 122 may be connected to a controller 126 which may be communicatively coupled to a sensor 128. The sensor 128 may sense the level of the vacuum (i.e., the pressure) within the vacuum chamber 22. In an embodiment, the sensor 128 may comprise a vacuum gauge (not shown) for monitoring the pressure within the vacuum chamber 22 (FIG. 2). Alternatively, the sensor 128 may comprise a motor controller (not shown) of the flywheel rotor 42 (FIG. 5) which may be used to monitor a deceleration rate of the flywheel rotor 42 and determine the amount of aerodynamic drag resulting from frictional drag with gas molecules 24 (FIG. 11) within the vacuum chamber 22. In this regard, the motor controller for the flywheel rotor 42 may be used to correlate a change in velocity of the flywheel rotor 42 (i.e., the deceleration rate) to an increase in aerodynamic drag on the flywheel rotor 42. The aerodynamic drag may then be correlated to the vacuum level within the vacuum chamber 22 such that the controller 126 may command the power source 122 to apply electrical current 124 to one or more of the sublimation elements 104 to cause a new layer 118 of reactive film 114 (FIG. 3) to be applied over the previously applied 116 (FIG. 15) layer of reactive film 114 when the deceleration rate exceeds a predetermined value.

Referring still to FIG. 7, although the gratings 150 are shown formed as a contiguous piece of material, it is contemplated that the gratings 150 may be formed as a plurality of sections (not shown) which may be separately mounted within the vacuum chamber 22 (FIG. 2). Furthermore, although FIG. 7 illustrates the gratings 150 as extending from the low end of the inner wall 30 to the upper end of the inner wall 30 and essentially encompassing the entirety of the circumference of the vacuum chamber 22, the gratings 150 may be provided in as many or as few sections as is desired to provide the necessary grating 150 surface area for pumping capability and to facilitate installation and/or maintenance of the sublimation pump 102. The sublimation pump 102 may preferably be provided in a small number of sections in order to minimize the quantity of mechanical fasteners required to mount the sublimation pump 102. In an embodiment, the sublimation pump 102 may be formed of one or more sections of sheet metal such as titanium sheet or aluminum sheet or other sheet material. The sheet metal may be formed into the corrugated configuration 164 (FIG. 4). Advantageously, forming the gratings 150 in the corrugated configuration 164 may provide structural stiffness to the gratings 150. In addition, the corrugated configuration 164 may provide a relatively large amount of grating 150 surface area upon which the reactive film 114 (FIG. 3) may be deposited. However, the gratings 150 may be formed in configurations other than the corrugated configuration 164.

Figure 8:
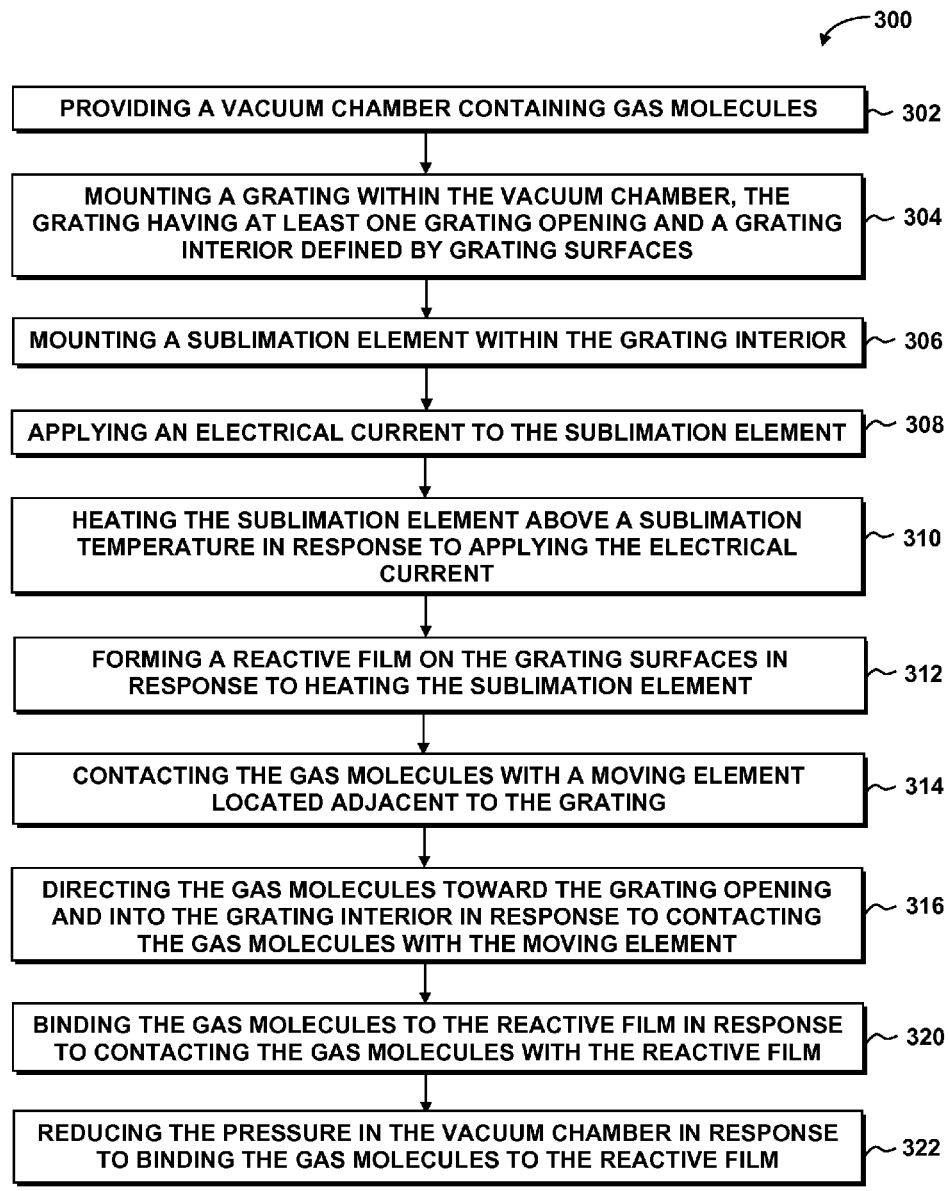
FIG. 8 is an illustration of a flowchart having one or more operations that may be included in a method for providing a vacuum within a vacuum chamber.
Figure 9:
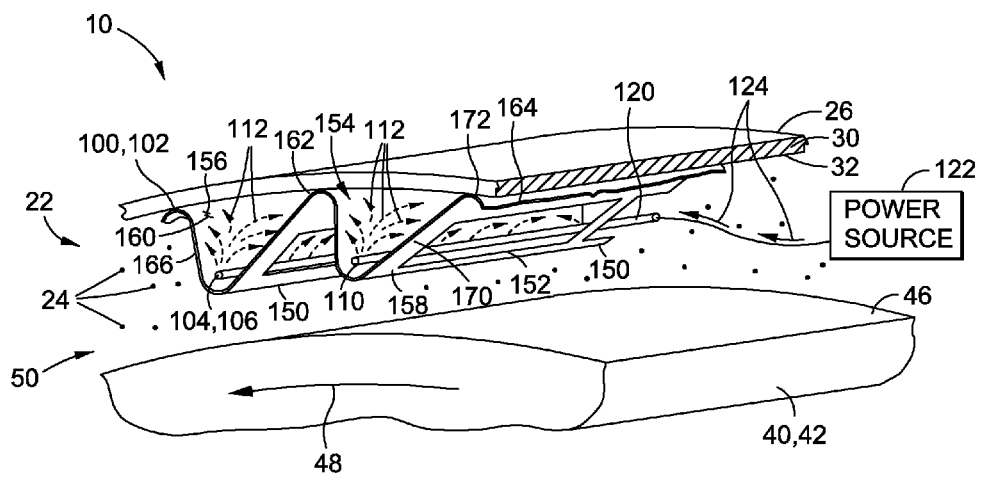
FIG. 9 is a perspective illustration of a portion of an embodiment of the sublimation pump illustrating the application of electrical current to the sublimation elements causing heating of the sublimation elements and the production of sublimated gas.

Referring now to FIG. 8 with additional reference to FIGS. 9-15, shown in FIG. 8 is a method of reducing pressure in a vacuum chamber 22 (FIG. 9). Although the present disclosure is described in the context of vacuum chamber 22 for a flywheel energy storage system 10 (FIG. 9), the sublimation pumping method disclosed herein may be applied to any application requiring an ultra-high vacuum.

Step 302 of the method may include providing the vacuum chamber 22 (FIG. 9) which may contain gas molecules 24 (FIG. 9) including active gases such as hydrogen, oxygen, water vapor, carbon monoxide, carbon dioxide, and nitrogen. The gas molecules 24 may also comprise other gases including noble gases, as was earlier mentioned, and non-reactive gases that may be captured by other pumping mechanisms (not shown). For example, as was earlier mentioned, a non-evaporable getter 174 (FIG. 4) material may be applied to certain locations within the vacuum chamber 22 to provide pumping capability for noble gases. The method disclosed herein may include initially evacuating or roughing the vacuum chamber 22 by reducing the pressure of the vacuum chamber 22 to at least approximately $1\times10^{-4}$ Torr. Roughing pumps (not shown) may be used for initially evacuating the vacuum chamber 22 to a relatively high vacuum or to an ultra-high vacuum. For example, roughing pumps may be used to reduce the pressure in the vacuum chamber 22 to at least approximately $1\times10^{-4}$ Torr after which the sublimation pump 102 (FIG. 9) may be activated to further reduce the pressure within the vacuum chamber 22 to $1\times10^{-5}$ Torr or lower.

Step 304 of the method of FIG. 8 may include mounting the gratings 150 (FIG. 12) within the vacuum chamber 22. Toward this end, the gratings 150 may include one or more grating mounting portions 172. For example, FIG. 9 illustrates the grating mounting portions 172 located between adjacent pairs of the gratings 150. One or more of the grating mounting portions 172 may be placed in contact with the vacuum chamber 22 such as against the inner wall 30 of the vacuum chamber 22. Mechanical fasteners (not shown) may be extended through the grating mounting portions 172 and into the inner wall 30 to secure the gratings 150 to the inner wall 30. However, other means may be employed to secure the gratings 150 to the vacuum chamber 22. For example, fittings (not shown), clips (not shown) or other mechanical features (not shown) may be incorporated into the vacuum chamber 22 for mating with complementary mechanical features (not shown) that may be formed on the gratings 150 to secure the gratings 150 to vacuum chamber 22.

Step 306 of the method of FIG. 8 may include mounting one or more sublimation elements 104 (FIG. 3) within the grating interior 154 (FIG. 3). FIGS. 4-6 illustrate the sublimation filaments 106 mounted to the gratings 150 by means of electrical insulators 108. The electrical insulators 108 may support the filaments 106 in spaced relation to the grating interior surfaces 156. The filament 106 may comprise rods having a circular cross section and extending length-wise along a length of the grating. However, as was earlier indicated, the sublimation elements 104 may be provided in any size, shape, and configuration and are not limited to the elongated filaments 106 extending length-wise along the gratings 150. Preferably, the sublimation elements 104 and the gratings 150 (FIG. 5) are configured to exploit the parasitic molecular drag pumping action of the moving outer surface 46 of the flywheel rotor 42 to enhance the gas molecule 24 (FIG. 11) capturing capability of the sublimation pump 102 (FIG. 5) which may improve the chemical pumping rate of the sublimation pump 102.

Step 308 of the method of FIG. 8 may include applying electrical current 124 (FIG. 9) to one or more of the sublimation elements 104 (FIG. 9) contained within the gratings 150 (FIG. 9). As shown in FIG. 9, the power source 122 (FIG. 7) may be activated by the controller 126 (FIG. 7). The controller 126 may receive signals from the sensor 128 (FIG. 7) which may sense the vacuum pressure within the vacuum chamber 22 (FIG. 9). The controller 126 may regulate the operation of the power source 122 to provide electrical current 124 to one or more of the sublimation elements 104. For example, the controller 126 may command the power source 122 to apply electrical current 124 to the sublimation elements 104 when the pressure within the vacuum chamber 22 exceeds a predetermined level. The sublimation elements 104 may be electrically connected in series or the sublimation elements 104 may be electrically connected in parallel. For example, the sublimation elements 104 are shown in FIG. 7 as being electrically connected to the power source 122 in parallel to one another which may minimize the magnitude of the required voltage relative to the magnitude of voltage that would be required for a single length of the sublimation elements 104 meandering through all of the gratings 150 of the sublimation pump 102.

Step 310 of the method of FIG. 8 may include heating the sublimation elements 104 (FIG. 9) above the sublimation temperature in response to applying the electrical current 124 (FIG. 9) to the sublimation elements 104. The sublimation temperature, as was earlier indicated, may comprise the vapor point of the sublimation material 110 (FIG. 9) where the sublimation material 110 transitions directly from solid phase to gaseous phase. The electrical current 124 may pass through the sublimation elements 104 for a period of time that is long enough to allow the sublimation elements 104 to be heated 120 (FIG. 9) above the vapor point in a vacuum. As was earlier indicated, the period of time for heating the sublimation elements 104 may be a few seconds, several minutes, or the heating period may extend up to several hours or longer depending upon the amount of surface area of the grating interior 154 (FIG. 9) to be covered with reactive film 114 (FIG. 10), the vacuum level within the vacuum chamber, and other parameters.

Figure 10:
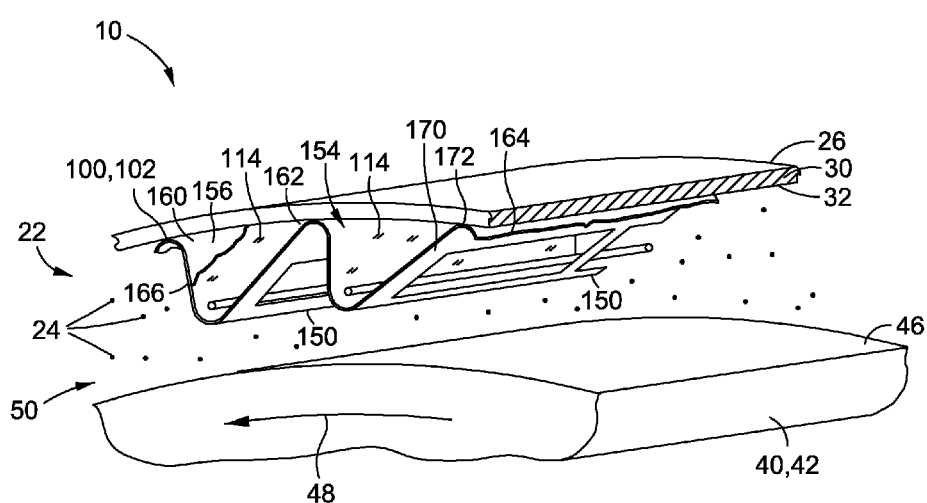
FIG. 10 is a perspective illustration of a portion of the sublimation pump illustrating a reactive film formed on the grating interior surfaces as a result of the sublimation of the sublimation elements.

Step 312 of the method of FIG. 8 may include forming the reactive film 114 (FIG. 10) on the grating 150 (FIG. 12) surfaces in response to heating the sublimation element. As can be seen in FIG. 9, the heating of the reactive film 114 (FIG. 10) produces sublimated gas 112 (FIG. 9). The sublimated gas 112 may accumulate as a relatively thin reactive film 114 on the surfaces surrounding the sublimation elements 104. The sublimated gas 112 may deposit as a reactive film 114 onto surfaces such as on the bare 160 grating interior surfaces 156 as shown in FIG. 10. The sublimated gas 112 may also deposit as a reactive film 114 on the inner wall surface 32 of the vacuum chamber 22. The grating exterior surfaces 158 (FIG. 12) may also be partially covered with reactive film 114 (FIG. 10) as a result of the sublimated gas 112 exiting the grating openings 152 (FIG. 9). In an embodiment, the sublimation pump 102 (FIG. 9) is preferably arranged to minimize line-of-sight between the sublimation elements 104 and the moving element 40 (e.g., the flywheel rotor 42) (FIG. 9) such that deposition of the reactive film 114 onto the moving element 40 and on other surfaces is minimized or prevented.

The reactive film 114 (FIG. 10) composition may comprise the composition of the sublimation material 110 (FIG. 9). For example, a sublimation filament 106 (FIG. 9) formed of titanium may sublimate and deposit as a titanium reactive film 114 on the grating 150 (FIG. 12) surfaces. The composition of the sublimation element 104 (FIG. 9) may be selected based upon the composition of the gas molecules 24 (FIG. 9) that may be present within the vacuum chamber 22 (FIG. 9). For example, the sublimation element 104 may be formed of nickel/titanium to enhance the capability of the reactive film 114 to capture hydrogen molecules. In this regard, the sublimation material 110 may be selected to bond with the type of active gas molecules 24 that may be present within the vacuum chamber 22.

Figure 11:
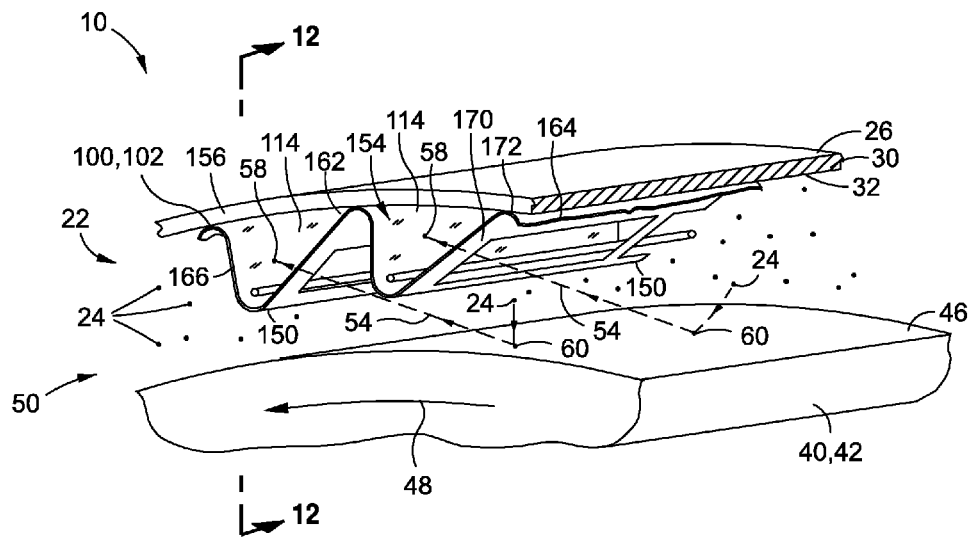
FIG. 11 is a perspective illustration of the sublimation pump illustrating gas molecules within the vacuum chamber contacting the rotating flywheel causing the gas molecules to be directed toward the opening and entering the grating interiors.

Step 314 of the method of FIG. 8 may comprise contacting 60 the gas molecules 24 with the moving element 40 such as with the outer surface 46 of the flywheel rotor 42 shown in FIG. 11. The outer surface 46 of the flywheel rotor 42 may impart kinetic energy to the gas molecules 24 causing the gas molecules 24 to accelerate. As was indicated earlier, the grating openings 152 (FIG. 12) are preferably oriented in a direction facing toward the direction of movement 48 of the moving element 40 (e.g., flywheel rotor 42). For example, FIG. 12 illustrates the grating openings 152 facing in a partially tangential and a partially radial direction to enhance the capability of the grating openings 152 to receive the gas molecules 24.

Step 316 of the method of FIG. 8 may comprise directing the gas molecules 24 toward the grating openings 152 and into the grating interior 154 in response to the gas molecules 24 contacting 60 the outer surface 46 of the flywheel rotor 42. For example, in FIG. 11, the gas molecules 24 are shown as being directed along a direction of movement 54 toward the grating openings 152 and into the grating interior 154. The grating openings 154 may be oriented toward a direction of movement 54 of the flywheel rotor 42 such that the gas molecules 24 directed toward the grating openings 152 may pass through the grating openings 152 and enter the grating interiors 154. In this regard, the flywheel rotor 42 may function as a molecular drag pump imparting energy to the gas molecules 24 and driving the gas molecules 24 toward the grating openings 152 and into the grating interiors 154.

Referring to FIG. 12, shown is a cross section of the sublimation pump 102 illustrating the gas molecules 24 being directed through the grating openings 152 and into the grating interior 154. Although the gas molecules 24 may bind with the reactive film 114 upon first contact with the reactive film 114, the gas molecules 24 may bounce or deflect 56 off of the grating interior surfaces 156 a number of times prior to the gas molecules 24 binding 58 with the reactive film 114 on the grating interior surfaces 156. As was indicated earlier, the grating interiors 154 preferably have an internal geometry that causes the gas molecules 24 entering the grating interior 154 to be deflected toward other grating 150 surfaces within the grating interior 154. For example, the gas molecules may be generally directed toward one or more grating corners 162 in the grating interior to increase the probability that the gas molecules 24 will be bound or captured by the reactive film 114. In this regard, the internal geometry of the grating interiors 154 is preferably such that the gas molecules 24 may bind 58 with the reactive film 114 on one of the grating interior surfaces 156 prior to the gas molecules 24 exiting the grating interior 154 through the grating openings 152. The internal geometry is preferably such that the gas molecules 24 will not exit the grating openings 152 as easily as the gas molecules 24 enter the grating openings 152.

Step 318 of the method of FIG. 8 may comprise binding the gas molecules 24 to the reactive film 114 in response to the gas molecules 24 contacting the reactive film 114. As can seen in FIG. 12, the gas molecules 24 may deflect 56 off of the grating interior surfaces 156 and may be deflected toward other surfaces within the grating interior 154. The energy of the gas molecules 24 may be gradually reduced in response to the deflection 56 of the gas molecules 24 off the grating 150 surfaces until the gas molecules 24 react and/or bind 58 with the reactive film 114. The reactive film 114 may chemically bind or otherwise immobilize, capture, absorb, or attach the gas molecules 24 to the reactive film 114 on or near the surface of the reactive film 114.

Figure 13:
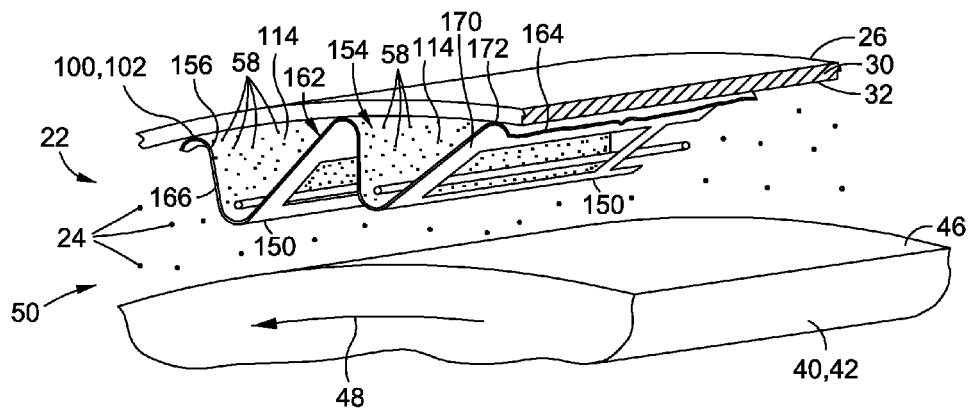
FIG. 13 is a perspective illustration of the sublimation pump illustrating a plurality of gas molecules bound to the reactive film.

Step 320 of the method of FIG. 8 may comprise reducing the pressure in the vacuum chamber 22 in response to binding the gas molecules 24 to the reactive film 114. For example, the sublimation pump 102 may be configured to reduce the pressure within the vacuum chamber 22 to at least approximately $1 \times 10^{-5}$ Torr due to molecular interaction and chemical reaction of the gas molecules 24 with the reactive film 114. FIG. 13 illustrates the reactive film 114 saturated with gas molecules 24. Saturation of the reactive film 114 may be detected by an increase in pressure within the vacuum chamber 22. The pressure within the vacuum chamber 22 may be monitored by a vacuum gauge. Alternatively, the vacuum pressure may be monitored by measuring the deceleration rate of the flywheel rotor 42 as was earlier mentioned. An increase in the deceleration rate of the flywheel rotor 42 may be indicative of an increase in frictional losses of the flywheel rotor 42 and may be used as a proxy to determine the actual vacuum pressure within the vacuum chamber 22. When it is determined that the pressure within the vacuum chamber 22 has increased to a predetermined level, the controller 126 (FIG. 7) of the power source 122 (FIG. 14) may command the power source 122 to apply electrical current 124 to one or more of the sublimation elements 104 in order to flash or re-heat the sublimation elements 104 (FIG. 12).

Referring to FIG. 14, shown is the power source 122 applying electrical current 124 to the sublimation elements 104 such that sublimated gas 112 is generated in response to heating 120 the sublimation element 104 through the application of electrical current 124. Referring to FIG. 15, the sublimated gas 112 (FIG. 14) forms a new layer 118 of reactive film 114 over the previously applied 116 layer of reactive film 114. The application of the new layer 118 of reactive film 114 over the previously applied 116 layer of reactive film 114 may seal the gas molecules 24 between the newly applied layer of reactive film 114 and the previously applied 116 reactive film 114 and prevent escape of the gas molecules 24.

Referring to FIG. 15, shown is a gas molecule 24 being directed toward the grating opening 152 and into the grating interior 154 and binding with the newly applied layer of reactive film 114. The process of intermittently heating the sublimation elements 104 may be repeated as needed based upon the current pressure within the vacuum chamber 22. Some or all of the sublimation elements 104 (FIG. 14) may be heated or flashed at any time to form a new layer 118 of reactive film 114 over the previously applied 116 layer of reactive film 114 and seal the gas molecules 24 between the layers of reactive film 114.

Advantageously, the sublimation system and method disclosed here provides a semi-passive means for maintaining an ultra-high vacuum in a vacuum chamber 22. The sublimation pump 102 has a relatively low part count and is relatively light in weight as compared to existing pumping systems configured to provide ultra-high vacuums. Furthermore, the sublimation pump 102 disclosed herein may be assembled in air (i.e. in a non-vacuum environment) and may be activated or powered once installed in a vacuum chamber 22 under a relatively high vacuum. Advantageously, the sublimation pump 102 disclosed herein requires a minimal amount of power which may contribute toward a relatively high level of efficiency for a flywheel energy storage system 10 or for any one of a variety of other applications including applications requiring an ultra-high vacuum.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A vacuum pump, comprising:
a grating mounted in spaced relation to a circumference of a moving element and having a grating opening and a grating interior bounded by at least one grating surface, the grating opening facing toward a direction of circumferential movement of an outer surface of the moving element; and
a sublimation element located within the grating interior and being configured to sublimate and form a reactive film on the grating interior upon heating of the sublimation element above a sublimation temperature;
the reactive film being effective to capture gas molecules entering the grating interior through the grating opening in response to the gas molecules contacting the moving element.

2. The vacuum pump of claim 1 wherein:
the sublimation element comprises an elongated filament.

3. The vacuum pump of claim 1 further comprising:
at least one electrical insulator configured to mount the sublimation element to the grating.

4. The vacuum pump of claim 1 wherein:
the grating being configured such that the gas molecules are directed toward the grating opening in response to contact of the gas molecules with the moving element.

5. The vacuum pump of claim 4 wherein:
at least a portion of the gas molecules directed toward the grating opening pass through the grating opening and enter the grating interior.

6. The vacuum pump of claim 1 wherein:
the moving element is a flywheel rotor;
the sublimation element and the grating are installed within an annular gap between the flywheel rotor and an inner wall of a flywheel energy storage system.

7. The vacuum pump of claim 1 wherein:
the grating has a corrugated configuration.

8. The vacuum pump of claim 1 further comprising:
a power source configured to apply an electrical current to the sublimation element to heat the sublimation element above a sublimation temperature.

9. The vacuum pump of claim 8 wherein:
the power source is configured to re-heat the sublimation element and cause the formation of a new layer of reactive film over a previously applied layer of reactive film.

10. The vacuum pump of claim 1 wherein:
the sublimation element is formed of a sublimation material comprising at least one of the following: aluminum, barium, columbium, magnesium, molybdenum, nickel, tantalum, thorium, titanium, and zirconium.

11. The vacuum pump of claim 1 wherein:
the reactive film has a composition configured to capture at least one of the following gas molecules: hydrogen, oxygen, water vapor, carbon monoxide, carbon dioxide, and nitrogen.

12. The vacuum pump of claim 1 wherein:
the sublimation element and the grating are configured to cooperate to reduce a pressure within a vacuum chamber to at least approximately $1 \times 10^{-5}$ Torr.

13. A vacuum pump for a vacuum chamber containing gas molecules and a moving element, comprising:
a grating mounted within the vacuum chamber in spaced relation to a circumference of the moving element and having a grating opening and a grating interior bounded by at least one grating surface, the grating opening facing toward a direction of movement of an outer surface of the moving element, the grating being configured such that at least a portion of the gas molecules contacting the moving element are directed toward the grating opening and into the grating interior; and
a sublimation element mounted within the grating interior and being configured to sublimate into a sublimated gas upon heating of the sublimation element above a sublimation temperature, the sublimated gas depositing onto the grating surface as a reactive film, the reactive film being configured to capture the gas molecules entering the grating interior in response to the gas molecules contacting the moving element.

14. A method of reducing pressure in a vacuum chamber, comprising the steps of:
heating a sublimation element located within a grating mounted in spaced relation to a circumference of a moving element and having a grating opening and a grating interior defined by at least one grating surface, the grating opening facing toward a direction of movement of an outer surface of the moving element;
forming a reactive film on the grating surface;
directing a gas molecule through the grating opening and into the grating interior in response to the gas molecule contacting the moving element; and
attaching the gas molecule to the reactive film.

15. The method of claim 14 further comprising the step of:
contacting the gas molecule with the moving element located outside of the grating.

16. The method of claim 14 further comprising the step of:
applying an electrical current to the sublimation element to cause heating of the sublimation element.

17. The method of claim 14 further comprising the steps of:
heating the sublimation element; and forming a new layer of reactive film over a previously applied layer of the reactive film.

18. The method of claim 14 further comprising the steps of:
monitoring pressure within the vacuum chamber; and
heating the sublimation element when the pressure exceeds a predetermined level.

19. The method of claim 14 further comprising the step of:
reducing the pressure within the vacuum chamber to at least approximately $1 \times 10^{-5}$ Torr.

* * * * *